Dec. 20, 1938.  W. H. BANCROFT  2,140,614
METHOD OF MAKING SHOE STIFFENERS
Filed Nov. 23, 1936   3 Sheets-Sheet 1
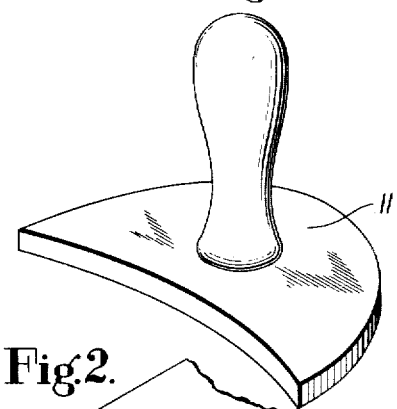
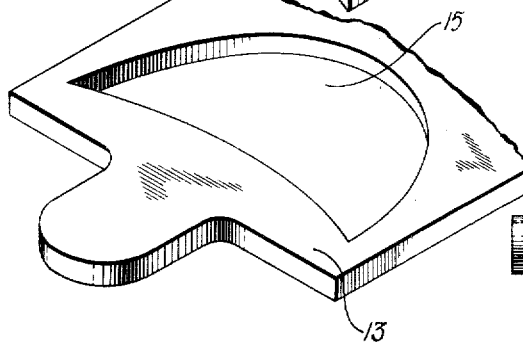
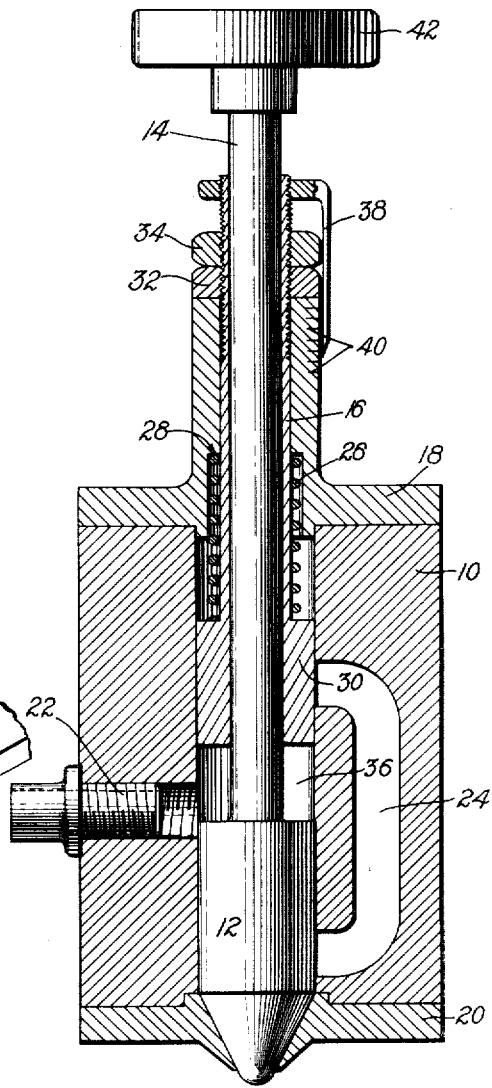
INVENTOR
William H. Bancroft
By his attorney
Victor Colby Dec. 20, 1938.  W. H. BANCROFT  2,140,614
METHOD OF MAKING SHOE STIFFENERS
Filed Nov. 23, 1936  3 Sheets-Sheet 2

INVENTOR
William H. Bancroft
By his Attorney
Victor Cobb

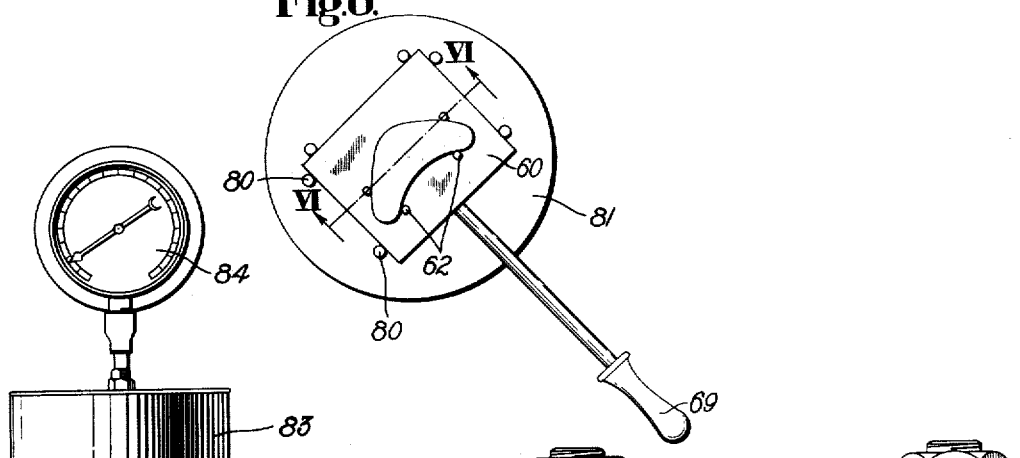
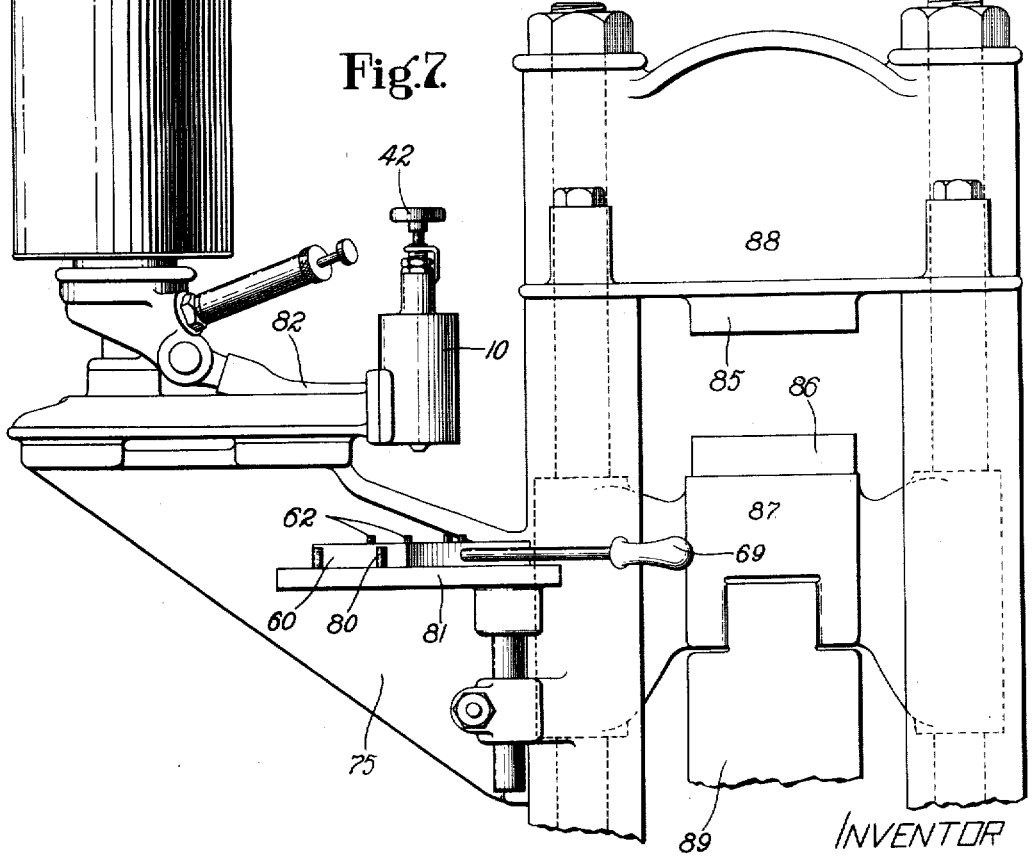

Patented Dec. 20, 1938

2,140,614

UNITED STATES PATENT OFFICE 2,140,614

METHOD OF MAKING SHOE STIFFENERS

William Harold Bancroft, Leicester, England, assignor to United Shoe Machinery Corporation, Paterson, N. J., a corporation of New Jersey Application November 23, 1936, Serial No. 112,280
In Great Britain December 16, 1935

2 Claims. (Cl. 154—2)

This invention relates to a method of manufacturing laminated stiffeners to be used in the manufacture of boots and shoes, and is herein described as embodied in a method of manufacturing a laminated toe stiffener.

A well known type of toe stiffener is composed of a plurality of layers of textile or other suitable sheet material cut to proper shape and carrying a charge of a suitable cellulosic derivative in the form of a viscous solution, such stiffeners being shipped ready for use in sealed containers. A toe stiffener of this kind is disclosed in United States Letters Patent No. 1,345,944, granted July 6, 1920, upon an application filed in the name of David B. Macdonald, said toe stiffener comprising layers of different graded sizes so as to produce thin marginal portions in the finished stiffener.

Hitherto laminated stiffeners of this general type have been made by hand, by placing a more or less impervious base layer upon the glass top of a table, spreading over this layer a coating of the solution of stiffening substance, and subsequently superposing upon this base layer and upon one another several layers of scrim, commonly of graduated sizes, each such scrim layer being spread with stiffening solution before the next layer is placed upon it. Usually a second more or less impervious layer is placed on the last scrim layer, and then the completed stiffener is removed from the table top with the aid of the spreading knife and placed in a container which is later sealed. This is a slow and laborious procedure requiring considerable skill in correctly superposing the layers and in spreading the stiffening solution. The spreading of solution in this manner a number of times for each stiffener, moreover, inevitably causes a considerable quantity of the solution to become spread upon the table, and this can not be scraped up and used in subsequent spreading operations before evaporation of solvent has rendered it too thick to be spread evenly. Consequently some large fraction of the stiffening substance used has to be removed from the table from time to time and redissolved for future use. Also the amount of solution spread varies in practice not only with individual workers but also with the various layers of any one stiffener by any one worker, so that there is a liability that stiffeners of any one batch of similar stiffeners will vary in eventual strength and stiffness.

Important objects of the present invention are to reduce the skill and labor required in making stiffeners of the character indicated, to effect a saving of stiffening solution in assembling such stiffeners, and to regulate to a uniform quantity the solution used in all stiffeners of any one style.

To this end there is provided a method in which the layers of the stiffener are assembled on one another at least mainly in an unimpregnated or uncharged condition; a measured mass of stiffening substance sufficient to impregnate the stiffener in the desired manner is located between two of the layers during the assembling operation, and subsequently pressure is exerted upon the mass to spread it over the desired area and to force it into contact with all the layers by a squeezing action. And preferably the margin of the stiffener is compressed to prevent flow of the stiffening substance into the margin.

Referring now to the accompanying drawings,

Fig. 1 is a perspective of a hand tool for use in spreading the measured charge of stiffening substance and in forcing it into contact with all the layers of a laminated stiffener which has been assembled on a table;

Fig. 2 is a perspective of a hand tool for use in pressing the margin of the assembled stiffener against the table so as to prevent flow of stiffening substance into the margin;

Fig. 3 is a vertical section of a device for ejecting a measured charge of impregnating substance;

Figure 4:
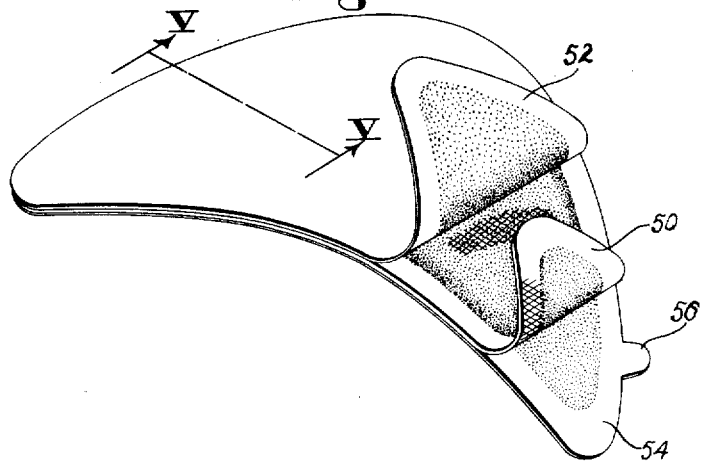
Fig. 4 is a view in perspective of a toe stiffener, the ends of two layers having been pulled up.

Fig. 7 is a front elevation of an apparatus comprising a device for storing a solution of stiffening substance under pressure, the device of Fig. 3 for delivering a measured mass of stiffening substance, a portable die or carrier in which the layers of a laminated stiffener may be assembled, and a portion of a press in which the carrier or die may be placed; and Fig. 8 is a plan view of the die or carrier.

According to one method of procedure by which a known form of stiffener may be made, a substantially impervious layer larger than any of several scrim layers to be used in the stiffener will be manually assembled on a plate with all the scrim layers upon it in their proper relative positions, and the pile thus formed will have discharged upon its central portion, in what amounts to a large drop, a measured mass (suitable to the area and desired thickness and stiffening character of the stiffener) of the viscous stiffening substance. After the measured mass of stiffening substance has been deposited on the uppermost scrim layer, a second more or less impervious layer larger than the largest scrim layer will be placed on the pile with its middle portion resting upon the unspread mass or large drop of stiffening substance. Then a hand pressing tool 11, such as that shown in Fig. 1, having an outline similar to but smaller than that of the laminated stiffener will be used to spread the stiffening substance and force it into the scrim layers and over the desired area of the surfaces of all of the layers. During the time the mass or drop is thus being squeezed out from the middle portion toward the edges of the stiffener, a guard frame, such as that shown in Fig. 2, will preferably be employed for the purpose of limiting the area over which the stiffening substance can be dispersed. This frame may be a flat plate 13 provided with an opening 15 similar in outline to but larger than that of the pressing tool, said opening being of an outline smaller than that of the pile of layers of the stiffener.

The mode of operation of the hand pressing tool and the guard frame is as follows:—The operator proceeds by means of the hand pressing tool to force the stiffening substance into the scrim layers and over the surfaces thereof, appropriate downward pressure on the mass of stiffening substance causing the mass to be flattened and dispersed with adequate uniformity from the middle of the pile of layers outwardly in all directions. While the mass is thus being squeezed outwardly, the guard frame is held in place. When pressure has been exerted by the pressing tool sufficient to squeeze down the drop or mass of stiffening substance so much that by its lateral flow it has expelled substantially all air from the scrim layers within the area defined by the guard frame, the latter is pressed down so that it will press firmly together the margins of the two impervious layers, thereby preventing flow of the stiffening substance beyond the area defined by the opening in the guard frame. While the guard frame is thus held firmly down, the final desired distribution of the mass of stiffening substance is secured (so as to leave a greater thickness of the stiffening substance in the middle portion of the stiffener) by rubbing with the hand pressing tool within the opening in the guard frame.

Referring to Fig. 3, a suitable device for delivering a measured mass of stiffening substance comprises a cylindrical container 10 having a central bore containing a manually movable plunger 12 on a stem 14 and an adjustable measuring sleeve 16. The upper end of the container is closed by a cap 18, the lower end having a cap 20 through a central orifice in which the charge is ejected. The lower end of the plunger 12 is conical and fits closely when depressed a conical seating in the cap 20. In one side of the container an inlet port 22 is bored and the opposite side contains a transfer port 24 communicating at its upper and lower ends with the central bore. A compression spring 26 housed between shoulders 28 in the cap 18 and the enlarged lower portion 30 of the sleeve 16 tends to maintain the sleeve depressed toward the plunger 12. The upper end of the sleeve 16 is threaded and carries adjusting and lock nuts 32, 34, the former being maintained normally in contact with the top of the cap 18 by the pressure of the spring 26. As will be explained later, the measured charge of substance becomes trapped in the central bore of the container in the annular space 36 between the lower end of the enlarged part 30 of the sleeve and the upper end of the plunger 12. The axial dimension of the space 36 may be adjusted to vary the amount of the charge by turning the adjusting nut 32, and raising the sleeve in the container to increase and lowering it to decrease the charge. At the top end of the threaded portion of the sleeve 16 there is mounted an indicating finger 38 which cooperates with a set of graduated markings 40 upon the cap 18 to give an indication of the amount of charge which the device is set to give. To explain the operation of this device it will be assumed that the inlet port is connected to a supply of the viscous substance under pressure and is full thereof, that the plunger 12 is in its lowest position as shown in Fig. 3, and that the transfer port 24 and space 36 are also filled completely with the substance. The operator pulls the plunger upward by pulling upon a hand hold 42 on the stem 14. As soon as the upper face of the plunger passes the upper edge of the port 22 a quantity of the substance becomes trapped in the space 36, and, since the substance is substantially incompressible, further raising of the stem 14 causes the sleeve 30 to rise against the pressure of the spring 26. As soon as the lower end of the part 30 of the sleeve passes the lower edge of the upper entry to the bore of the transfer port 24 the previously trapped charge will be expelled, by further upward movement of the plunger 12, into the transfer port, the lower entry of which has now been uncovered by the upward movement of the plunger. The upper face of the plunger contacts eventually with the lower end of the part 30, having entirely expelled the charge. An equal quantity to the charge expelled into the transfer port will be forced out of the lower entry of the port into the central bore below the plunger. The operator now pushes smartly downward upon the nut 42 forcing the plunger 12 back to its lowest position, this action ejecting a measured charge of the substance from the nozzle formed by the central orifice in the cap 20.

In carrying out an operation of toe stiffener manufacture in the manner above described, which involves the manual assembly of several scrim layers in a pile upon a substantially impervious layer before the discharge upon the pile at its central portion of a single mass or drop of viscous stiffening solution, there is found need for care, especially where the layers are of graded area, in adding layers to the pile and in discharging the stiffening solution upon the pile, not to displace the layers relatively to one another and so put them out of register with one another. Such need for care can be almost entirely avoided by discharging upon the central portion of the impervious bottom layer a small amount of a suitable solution which may be the same solution as the measured mass later to be discharged upon the pile. Then, as each layer is placed in turn upon the layer below it and is lightly pressed into position, the solution not only acts to cause these two layers to adhere sufficiently together to resist accidental relative displacement of them, but a little of the solution oozes through the upper layer to be ready to act in anchoring the next layer when that is placed upon the pile. Consequently this pile when completed to the stage of being ready for the discharge thereon of the measured mass or drop of stiffening substance, is a steady pile of layers reasonably well anchored together at a single locality restricted as regards the area of the layers but extending heightwise from bottom to top of the pile.

There can be obtained readily by the above procedure stiffeners of the type under consideration which embody layers of any desired different sizes or appropriate materials and in any appropriate relative positions and yet containing, without depending upon the care and labor incident to spreading layer after layer with the stiffening substance, a definite and well distributed quantity of substance untouched by any spreading tool and obtained freshly from an unexposed supply and therefore uniform in composition and viscosity.

It has been found that a procedure involving the use of a measured charge of impregnant, as disclosed above, may be availed of to make highly efficient toe stiffeners of the type which can be canned in the soft condition without any need to resort to such a piling of a plurality of scrim or other fabric intermediate layers as has been described above; and in illustration of this alternative procedure there will now be described with reference to the drawings one way of making stiffeners of the sealed container type referred to which, although comprising no more than three layers in all, are of a character well suited for use in plain camp shoes in which the rear margin of the stiffener should not make itself objectionably evident in the shoe.

Figure 5:
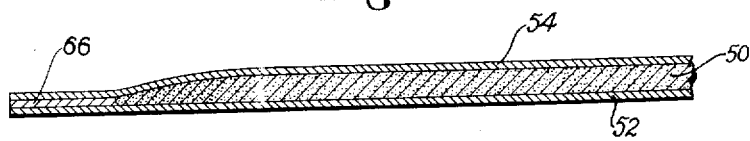
Fig. 5 is a diagrammatical section of a portion of a stiffener on a larger scale than that of Fig. 4 on the line 5—5 of that figure.

Referring now to Figs. 4 and 5, the three layers will be assumed to be a central and charge-carrying layer 50 of swansdown (or cotton flannel) well "raised" or fleeced on each face and two outer layers of paper 52, 54. These layers respectively function to assist in preventing any of the charge of stiffening substance from coming out of the stiffener while it is stored in the can and in preventing the stiffeners from sticking together when so stored. The layer 52 is of filter paper or similar thin bibulous paper, and the layer 54 is of thin relatively tough so-called "grease proof" paper completely impervious both to the solvent and the stiffening substance. The layer 54 is intended to be peeled off the stiffener by the user just before he places it in the shoe so as to expose one face of the charge-carrying swansdown for adhesion to the adjacent layer of material of the shoe upper. To facilitate the peeling off of the grease proof paper layer 54, that layer conveniently is provided with a projecting tab 56 which can be easily caught hold of to start the peeling. The layer 52 is intended to be left on the stiffener in the shoe but, owing to its bibulous character, to permit evaporation, when in the shoe, of solvent of the charge while helping to hold back in the stiffener solid matter of the charge. In making up this stiffener use is conveniently made of a power press adapted, for reasons which will become apparent hereinafter, to apply relatively considerable pressure by a comparatively slow squeeze to the assembled constituents of the stiffener previously placed between a recessed or cavity die and a flat plate.

Figure 6:
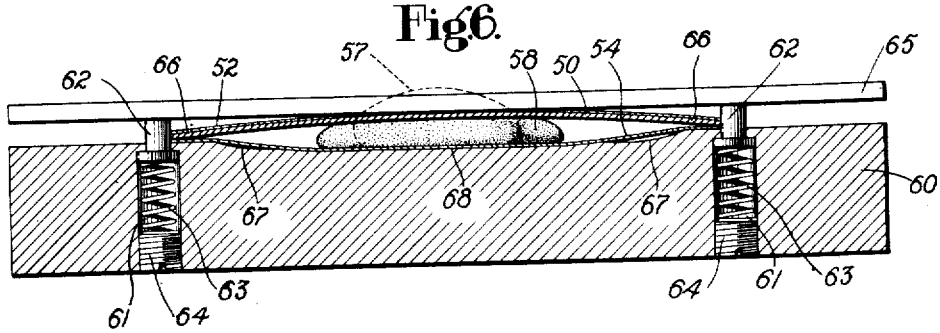
Fig. 6 is a section on the line 6—6 of Fig. 8 of the parts composing the stiffener of Fig. 4 assembled in a die.

Referring now to Fig. 6, a die member, having a recess or cavity in its upper surface, is shown at 60. In suitably spaced bores 61 in this member are mounted plungers 62 pressed beyond the upper surface by springs 63 backed by screw plugs 64. Resting upon the plungers 62 is a plate 65.

It will be pointed out at this stage that a differently shaped cavity and different spacing of the plungers 62 will in usual practice be required for every different size and style of toe stiffener. In assembling the component parts of the stiffener, it has been found convenient first to place the impervious paper layer 54 over the cavity in the die member 60 allowing it to be located by the plungers 62, as may also be seen in Fig. 8. The measured drop or mass of stiffening substance is next discharged upon the layer 54, said mass being sufficient to effect the desired relatively uniform impregnation of the middle portion of the swansdown layer and graduated impregnation of other portions of that layer but not in excess of what is needed for that purpose. For discharging the measured drop the apparatus previously described with reference to Fig. 3 may be employed and may be operated by treadle if desired. The drop will be discharged centrally upon the layer 54, the die member 60 conveniently being positioned accurately under the nozzle of the apparatus by locating pins 80 on a table 81, fixed on a bracket attached to a press later to be described, as shown in Fig. 7. The swansdown layer 50 will then be laid upon the drop which may at this moment occupy a position and outline much as is indicated by the dotted outline 57 in Fig. 6. The layer 52 of filter or like paper will next be placed over the swansdown layer, all the layers being located against lateral shifting by the plungers 62, and finally the plate 65 will be placed over them. The weight of this plate will then flatten out the drop until it has a shape approximately indicated by the outline 58 in Fig. 6. As indicated in Figs. 5 and 6, the three layers of the stiffener may be all of the same size and shape and be assembled in substantially exact register, but the swansdown layer 50 may, if desired, be of smaller area though geometrically similar in shape to the two covering layers 52 and 54 and may be placed so as to leave the same width of overlap of the outer layers all the way round its margin. In either event, the die cavity is preferably of such size and shape that a marginal portion 66 of all three layers of the assembly can be caused to project beyond the cavity all round the assembly and conveniently to project more at the portion which will constitute the rear margin of the stiffener in the shoe than along that margin which will, ordinarily, be lasted over upon the shoe bottom. Such projecting portions of the three layers will therefore receive heavy pressure from the parallel faces of the plate and of the die member outside the cavity of the latter when the die and plate are pressed together as will later be described. The die cavity conveniently has a flat bottom portion 68, as shown in Fig. 6 parallel to the plane face of the die member outside the cavity, and this bottom is preferably joined all round to the corresponding margins of the cavity by a bevel or bevels 67 which may be wider at that portion extending along the margin of the cavity that corresponds to the rear margin of the stiffener.

Referring now to Figs. 7 and 8, the apparatus 10 for ejecting the measured charge or drop of impregnating substance is mounted on the base of, and its inlet port is connected by a pipe 82 with, an apparatus 83 for storing and supplying a quantity of the stiffening solution. Any suitable apparatus for holding a viscous liquid and maintaining it under pressure so that, when permitted to do so, the liquid will flow out through a discharge pipe may be employed, the apparatus illustrated being substantially like that disclosed in United States Letters Patent No. 1,953,209, granted April 3, 1934, upon an application filed in the name of Walter Barnett. This apparatus is provided with a pressure indicating gage 84 and is mounted on a bracket 75 fixed to the side of a press having pressing members 85 and 86. Any suitably strong press may be employed. The press shown is one of a type commonly employed for molding soles for boots or shoes but having flat-surfaced members 85 and 86 instead of the usual contoured sole molds. The upper pressing member 85 is carried by the fixed crosshead 88 of the press and the lower member 86 is carried upon a reciprocating head 87 actuated by a toggle of which only the upper link 89 appears in the drawings.

As has been stated, the die member 60 is placed on the table 81 while the layers of the stiffener are assembled, the charge of stiffening solution deposited and the plate 65 (not shown in Figs. 7 and 8) placed above them. The die member 60 and plate 65 are lifted, by a handle 69 on the die member, from the table by the operator and placed upon the press member 86 while the latter is lowered. The press is then set in operation and the head 87 rises, squeezing the die and plate against the upper member. The approach of the lower member 86 toward the fixed upper member 85 is slow in this type of machine, and the press is arranged automatically to stop for an interval when the member 86 reaches its highest position, usually a dwell of about one second in this position being sufficient to press the layers of the stiffener together and to force the charge of impregnant fully all over the area determined by the die cavity in the manner now to be explained. The plate 65 first acts to press the swansdown layer 50 upon the drop or measured mass 58, flattening the latter in all directions outward over the layer 54 from the center of that layer. However, before the drop has spread too far, the margins of all three layers all round will have begun to be nipped between the plane faces of the plate and of the die member outside the cavity so that spread of the stiffening substance on or in the swansdown is reliably confined to the area represented by the die cavity. As the pressing then proceeds, the substance is gradually forced into and throughout the whole of that portion of the swansdown layer corresponding to the die cavity, it being understood that the depth of the cavity and the bevel of the angle or angles 67 are so chosen, with reference to the thickness and nature of the swansdown, the amount of stiffening substance for which the latter is intended to act as vehicle and other relevant factors, that when the pressing is completed the parts of the layers which have projected beyond the die cavity will have been permanently compacted and set to give all round the stiffener the very thin marginal strip 66 (Fig. 5) of a width of say at least one quarter of an inch, free from stiffening substance. This marginal strip is connected all round the stiffener with the relatively thick body portion of the stiffener, which is for the most part of uniform thickness and is substantially uniformly impregnated with the intended maximum of stiffening substance, by a zone compacted and set permanently to be of appropriately tapering thickness and containing a progressively increasing percentage of stiffening substance to fabric in the direction of increasing thickness. Further, the conditions are so controlled that not only are the above results secured but no undue amount, if indeed any appreciable amount, of the stiffening substance remains actually lying on the surface of the swansdown between the latter and the paper layers, and at most only some of the solvent of the stiffening substance has wet the outer face of the filter paper layer.

Accordingly, when the pressing members 85, 86 are moved apart, the plate 65 can be easily removed and the stiffener can be easily lifted from between the plate and the die member, both these parts remaining unsoiled and free from stiffening substance. The stiffener can be placed at once with others in a can to be hermetically sealed until required for use, and with the assurance that the stiffeners will not stick together or become spoiled by oozing of the stiffening substance. Although some of the solvent of the substance may, during storage in the can, seep into the marginal strip 66, it will not be accompanied by the stiffening substance; and likewise although there will be a gradual creep of the substance with solvent, in a direction outward from the body of the stiffener in the tapering zone, a condition of practical stability will in time be reached in which there is more concentration of the solution in the tapering zone than when the stiffener was freshly made. Such creeping action can be allowed for by appropriate exaggeration of the graduation produced at the time of making the stiffener. The permanent set given by the high pressure to the marginal strip 66 and to the fibrous material of the layers of the tapered zone plays an important part in securing the relative substantial permanence of condition just described.

It is a virtue of a procedure such as that hereinbefore described that it allows the use of an unusually high concentration of stiffening substance in solution and therefore of obtaining a very high charge of stiffening substance in the impregnated layer, since the viscosity of the solution is within wide limits immaterial. Indeed provided that the stiffening substance has still sufficient fluidity or plasticity to be capable of being forced by die and pressure action of the kind described into the fabric, the more doughy and the less liquid it is the easier is it to measure off and obtain discharge of just the size and shape of drop required in just the position desired.

Nothing hereinbefore stated should be construed as implying that the invention is limited in its application to toe stiffeners or that the charging of stiffeners with molten thermoplastic material is excluded from the scope of the invention sought to be protected. The terms "solvent" and "solution" have been used throughout the description in a general sense as embracing respectively swelling or dispersing agents for colloids and the condition attained by the use of such agents.

Having thus described my invention, what I claim as new and desire to secure by Letters Patent of the United States is:—

1. The method of making a laminated shoe stiffener which comprises assembling in superposed relation a plurality of layers of the desired shape, one of which at least is pervious to an impregnating stiffening substance, with a measured mass of viscous substance between two of the layers, said mass being of a content to impregnate the stiffener in the desired manner, and subsequently exerting pressure simultaneously upon both faces of the assembled stiffener throughout the whole area of said faces in such manner as to force the stiffening substance through the pervious layer and to spread it in contact with all the layers.

2. The method of making a shoe stiffener which comprises superposing a plurality of layers of the desired shape one of which at least is pervious to a viscous stiffening substance, delivering upon one layer before the succeeding layer is superposed upon it a measured mass of stiffening substance of a content sufficient to impregnate the stiffener, exerting along the entire margin of the assembled stiffener a pressure sufficient to limit the extent to which the substance will be spread, and exerting pressure upon the remaining portions of the assembled stiffener to force the substance through the pervious layer and to spread it into contact with all the layers.

WILLIAM HAROLD BANCROFT.

CERTIFICATE OF CORRECTION.

Patent No. 2,140,614.   December 20, 1938.

WILLIAM HAROLD BANCROFT.

It is hereby certified that error appears in the printed specification of the above numbered patent requiring correction as follows: Page 3, first column, line 33, for the word "camp" read vamp; and that the said Letters Patent should be read with this correction therein that the same may conform to the record of the case in the Patent Office.

Signed and sealed this 2nd day of May, A. D. 1939.

Henry Van Arsdale (Seal)   Acting Commissioner of Patents.

through the pervious layer and to spread it in contact with all the layers.

2. The method of making a shoe stiffener which comprises superposing a plurality of layers of the desired shape one of which at least is pervious to a viscous stiffening substance, delivering upon one layer before the succeeding layer is superposed upon it a measured mass of stiffening substance of a content sufficient to impregnate the stiffener, exerting along the entire margin of the assembled stiffener a pressure sufficient to limit the extent to which the substance will be spread, and exerting pressure upon the remaining portions of the assembled stiffener to force the substance through the pervious layer and to spread it into contact with all the layers.

WILLIAM HAROLD BANCROFT.

CERTIFICATE OF CORRECTION.

Patent No. 2,140,614. December 20, 1938.

WILLIAM HAROLD BANCROFT.

It is hereby certified that error appears in the printed specification of the above numbered patent requiring correction as follows: Page 3, first column, line 33, for the word "camp" read vamp; and that the said Letters Patent should be read with this correction therein that the same may conform to the record of the case in the Patent Office.

Signed and sealed this 2nd day of May, A. D. 1939.

Henry Van Arsdale (Seal) Acting Commissioner of Patents.